US012706334B2

(12) United States Patent
Weng et al.

(10) Patent No.: US 12,706,334 B2
(45) Date of Patent: Aug. 11, 2026

(54) THERMAL MANAGEMENT SYSTEM FOR A TRACTION BATTERY OF AN ELECTRIC VEHICLE, ELECTRIC VEHICLE, AND METHOD FOR OPERATING A THERMAL MANAGEMENT SYSTEM

(71) Applicant: Volvo Car Corporation, Gothenburg (SE)

(72) Inventors: Chenyang Weng, Gothenburg (SE); Yidan Lai, Gothenburg (SE); Patrik Johansson, Gothenburg (SE); Teik Huat Ong, Gothenburg (SE); Raimo Kabral, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 682 days.

(21) Appl. No.: 18/071,693

(22) Filed: Nov. 30, 2022

(65) Prior Publication Data

US 2023/0170546 A1 Jun. 1, 2023

(30) Foreign Application Priority Data

Dec. 1, 2021 (EP) .................................... 21211793

(51) Int. Cl.
*H01M 10/625* (2014.01)
*B60L 58/26* (2019.01)
(Continued)

(52) U.S. Cl.
CPC ........... *H01M 10/625* (2015.04); *B60L 58/26* (2019.02); *H01M 10/613* (2015.04); (Continued)

(58) Field of Classification Search
CPC .. H01M 10/625; H01M 10/613; H01M 10/63; H01M 10/6563; H01M 2220/20;
(Continued)

(56) References Cited

U.S. PATENT DOCUMENTS

2003/0118891 A1 6/2003 Saito et al.
2005/0168180 A1 8/2005 Minekawa et al.
(Continued)

FOREIGN PATENT DOCUMENTS

CN 1652952 A 8/2005
CN 204143870 U 2/2015
(Continued)

OTHER PUBLICATIONS

May 4, 2022 European Search Report issued in corresponding International ApplicationNo. 21211793.
(Continued)

*Primary Examiner* — Kaity V Chandler
(74) *Attorney, Agent, or Firm* — Clements Bernard Walker; Christopher L. Bernard

(57) ABSTRACT

A thermal management system for a traction battery of an electric vehicle. The thermal management system includes an actuator for influencing a temperature of the traction battery, at least one microphone for detecting a sound in an environment of the thermal management system, and a control unit. The actuator and the microphone are communicatively connected to the control unit such that the actuator is controllable, by the control unit, based on a detection signal of the at least one microphone. Moreover, an electric vehicle having a traction battery and such a thermal management system is presented. Furthermore, a method for operating a thermal management system for a traction battery of an electric vehicle is disclosed. The method is applied during charging of the traction battery.

13 Claims, 2 Drawing Sheets

(51) Int. Cl.
*H01M 10/613* (2014.01)
*H01M 10/63* (2014.01)
*H01M 10/6563* (2014.01)
*H04R 1/08* (2006.01)

(52) U.S. Cl.
CPC ....... *H01M 10/63* (2015.04); *H01M 10/6563* (2015.04); *H01M 2220/20* (2013.01); *H04R 1/08* (2013.01)

(58) Field of Classification Search
CPC .... B60L 58/26; B60L 2240/545; B60L 58/24; B60L 53/00; H04R 1/08; Y02T 10/70; B60K 11/02; B60K 11/06
See application file for complete search history.

(56) References Cited

U.S. PATENT DOCUMENTS

| | | | | |
|---|---|---|---|---|
| 2016/0301119 | A1 | 10/2016 | Izumi et al. | |
| 2016/0361990 | A1 | 12/2016 | Porras et al. | |
| 2018/0290555 | A1* | 10/2018 | Zoon | H02J 7/007 |
| 2020/0247252 | A1 | 8/2020 | Dudar | |
| 2020/0383580 | A1* | 12/2020 | Shouldice | B60W 40/08 |

FOREIGN PATENT DOCUMENTS

| | | | | |
|---|---|---|---|---|
| CN | 106004859 A | 10/2016 | | |
| CN | 109779939 B | 5/2019 | | |
| CN | 113246769 A * | 8/2021 | | G10L 21/0216 |
| DE | 102008026232 A1 | 12/2009 | | |
| DE | 102018204992 A1 | 10/2019 | | |
| DE | 102020200972 A1 | 7/2021 | | |
| DE | 102020102946 A1 | 8/2021 | | |
| JP | S56107701 A | 8/1981 | | |

OTHER PUBLICATIONS

Apr. 30, 2025 Office Action issued by the Chinese Patent Office in corresponding Chinese patent application No. 202211502679.5.
EP office action Apr. 10, 2026.
Hua et al., Recent progress in battery electric vehicle noise, vibration, and harshness, First Published Mar. 31, 2021 Review Article, pp. 1-14.
Article, Why does my all-electric vehicle makenoise while charging?

* cited by examiner

THERMAL MANAGEMENT SYSTEM FOR A TRACTION BATTERY OF AN ELECTRIC VEHICLE, ELECTRIC VEHICLE, AND METHOD FOR OPERATING A THERMAL MANAGEMENT SYSTEM

CROSS-REFERENCE TO RELATED APPLICATION

The present disclosure claims the benefit of priority of co-pending European Patent Application No. 21211793.1, filed on Dec. 1, 2021, and entitled "THERMAL MANAGEMENT SYSTEM FOR A TRACTION BATTERY OF AN ELECTRIC VEHICLE, ELECTRIC VEHICLE, AND METHOD FOR OPERATING A THERMAL MANAGEMENT SYSTEM," the contents of which are incorporated in full by reference herein.

TECHNICAL FIELD

The present disclosure relates to a thermal management system for a traction battery of an electric vehicle.

Moreover, the disclosure is directed to an electric vehicle having a traction battery and a thermal management system.

Additionally, the disclosure relates to a method for operating a thermal management system for a traction battery of an electric vehicle.

BACKGROUND

In this context, a thermal management system is a system for keeping a temperature of the traction battery within a desired temperature range such that the traction battery can be used in an efficient and effective manner. Due to internal electrical resistances, charging and discharging of the traction battery produces heat. Depending on an ambient temperature, the thermal management system may be operated in order to cool the traction battery, i.e. in order to dissipate heat. In a very cold environment, the thermal management system may also be operated in order to warm the traction battery. This can especially be necessary before starting the electric vehicle in such a cold environment.

The thermal management system may, thus, also be designated as a combined heating and cooling system. A further synonym for a thermal management system is thermal control system.

When operating the thermal management system not only the comfort of the users of the corresponding electric vehicle has to be considered, but also the comfort of uninvolved people staying in the surroundings of an electric vehicle. This is especially important in a situation in which the electric vehicle is parked and thus does not produce any road noise or other driving related noise.

BRIEF SUMMARY

The objective of the present disclosure is to improve the comfort of uninvolved people in such a situation.

The problem is at least partially solved or alleviated by the subject matter of the present disclosure.

According to a first aspect, there is provided a thermal management system for a traction battery of an electric vehicle, including an actuator for influencing a temperature of the traction battery, at least one microphone for detecting a sound in an environment of the thermal management system, and a control unit. The actuator and the at least one microphone are communicatively connected to the control unit such that the actuator is controllable, by the control unit, based on a detection signal of the at least one microphone. In this context, the detection signal corresponds to a detected sound in the environment. It is thus possible to take into account a sound being present in the environment when controlling the actuator. Therefore, the actuator can for example be controlled or operated such that a noise resulting from the operation of the actuator is less loud than the sound of the environment. Alternatively, the actuator can be controlled or operated such that the noise resulting from the operation of the actuator is louder than the sound of the environment, but differs therefrom by a predefined maximum sound level value. Consequently, the noise emissions of the thermal management system, especially the noise emissions from the actuator, can be controlled such that the comfort of uninvolved persons in the surroundings of such a thermal management system is increased. This is especially the case if a sound being present in the environment is used as a reference or threshold. Generally speaking, the noise pollution resulting from the operation of the thermal management system is decreased. Again, this is especially the case if the sound of the environment is taken as a reference or threshold.

It is noted that the noise emissions of the thermal management system may conflict with operational objectives of a traction battery being equipped with the thermal management system. This is especially the case if the traction battery is to be charged. Fast and efficient charging may need powerful cooling. To this end, the actuator may need to be operated at high power leading to a rather high noise level. However, the thermal management system of the present disclosure makes it possible to provide a good compromise between operational objectives of the traction battery, e.g. while charging, and the acoustic protection of the environment. Especially in situations where the operation of the traction battery, e.g. the charging, is not critical in terms of time, an enhanced acoustic protection of the environment can be guaranteed.

Depending on the type of the microphone used, the control unit may include an analogue-digital converter. Consequently, the detection signal of the microphone can be efficiently processed in the control unit.

In an example, the actuator may include a ventilator. An alternative term for ventilator is fan. Such actuators are especially used for cooling operations. Ventilators have the advantage that they can be controlled in a simple manner. Consequently, the noise being generated by a ventilator is easily controllable and adjustable. In general, the level of operational noise being produced by a ventilator is relatively low. Thus, a high level of comfort for the environment is guaranteed.

In an example, the at least one microphone is an internal microphone being configured for being located in an interior of the electric vehicle. An interior of the electric vehicle includes for example a motor compartment and/or a driver/passenger cabin. It is understood, that also more than one internal microphone can be used. Using such microphones, the sound of the environment is detected inside the vehicle. The microphone is thus well protected from undesired environmental influences. This increases the reliability and the lifetime of the microphone.

In an example, the at least one microphone is an external microphone being configured for being located at an exterior of the electric vehicle. Again, it is understood, that also more than one external microphone can be used. Such an external microphone is located in the environment of the thermal management system or at the border thereof. Consequently, a sound of the environment can be detected with high reliability and accuracy.

Of course, it is also possible to have one or more microphones being an internal microphone and one or more microphones being an external microphone.

In an example, the control unit includes a classification unit being configured for receiving the detection signal of the at least one microphone and being configured for attributing at least one of a plurality of predefined categories to the detection signal. In other words, the detection signal and thus the corresponding sound from the environment can be classified. Exemplary categories include human speech, silence, city traffic, emergency vehicle, birds/insects and wild animal. Consequently, it is possible to capture the environment from an acoustic perspective and operate the thermal management system such that it does not disturb at all the environment or only produces a noise below a predefined threshold of disturbance. Generally speaking, the noise pollution resulting form the thermal management system can be limited to an acceptable level which is determined based on the type of acoustic environment.

In the present context it is understood that the detection signal being received by the classification unit may come directly from the microphone or may have been treated or processed by other units of the control unit before.

In an example, the control unit may include a volume unit being configured for receiving the detection signal of the at least one microphone and being configured for assessing a degree of loudness of the detection signal. In the present context, the terms volume and degree of loudness are synonyms. In simplified words, the control unit is configured for assessing how loud the sound from the environment is. The degree of loudness may for example be measured in decibel. The actuator can, thus, be operated such that it is less loud, produces a noise of the same loudness or be louder by a predefined maximum delta. Therefore, the actuator can be operated such that it is acoustically not noticeable when considering the environmental sound or only noticeable to a predefined degree.

In an example, the control unit may include a diagnostics unit being configured for receiving the detection signal of the at least one microphone and being configured for providing a diagnosis result based on the detection signal. The diagnosis result may especially concern a traction battery being equipped with the thermal management system of the present disclosure or the thermal management system itself. The microphone(s) can, thus, also be used to detect acoustic abnormalities which may be an indication of wear or failure. For example, a defective control of the actuator can be determined if a noise resulting from the actuator is detected in a situation in which an operation of the actuator is actually not desired.

As before, it is understood that the detection signal being received by the volume unit and/or the diagnostics unit may come directly from the microphone or may have been treated or processed by other units of the control unit before.

According to a second aspect, there is provided an electric vehicle having a traction battery and a thermal management system according to the present disclosure. The at least one microphone is mounted in an interior of the electric vehicle or at an exterior body shell of the electric vehicle. In a case in which the at least one microphone is mounted in an interior of the vehicle, it may be arranged within a driver/passenger cabin or a motor compartment of the vehicle. If the at least one microphone is mounted at an exterior body shell of the vehicle, it may be located in or at a roof frame. Alternatively, the microphone may be located in or at or under a rearview mirror, in or at a door handle, in or at a spoiler, or in or at a bumper. The effects and advantages explained in connection with the thermal management system apply mutatis mutandis to the electric vehicle and vice versa.

According to a third aspect, there is provided a method for operating a thermal management system for a traction battery of an electric vehicle during charging of the traction battery. The method includes:

- receiving a detection signal corresponding to a sound in an environment of the thermal management system, and
- providing a control signal to an actuator for influencing a temperature of the traction battery based on the detection signal.

The detection signal is for example generated by a microphone. The method renders it possible to take into account a sound being present in the environment when providing the control signal to the actuator. In other words, the actuator can be controlled as a function of the sound in the environment. Thus, the actuator can for example be controlled or operated such that a noise resulting from the operation of the actuator is less loud than the sound of the environment. Alternatively, the actuator can be controlled or operated such that the noise resulting from the operation of the actuator is louder than the sound of the environment, but differs therefrom by a predefined maximum sound level value. Consequently, the noise emissions of the thermal management system, especially the noise emission from the actuator, can be controlled such that the comfort of uninvolved persons in the surroundings of such a thermal management system is increased. This is especially the case if a sound being present in the environment is used as a reference or threshold. Generally speaking, the noise pollution resulting from the operation of the thermal management system is decreased. Again, this is especially the case if the sound of the environment is taken as a reference or threshold.

The method according to the present disclosure is performed during charging of the traction battery. In such a situation, the vehicle including the traction battery and the thermal management system is at stand still. Thus, charging in the sense of the present disclosure has to be distinguished from recuperation, i.e. charging while driving.

In an example, the method is performed periodically. Thus, the method can react to changes in the detection signal corresponding to changes of the sound in the environment. The control signal can be provided accordingly such that also in situations where the sound in the environment is changing, the noise pollution resulting from the operation of the thermal management system is decreased.

In an example, the method includes attributing at least one of a plurality of predefined categories to the detection signal and providing the control signal based on the attributed category. In other words, the detection signal and the corresponding sound in the environment are classified. The categories may for example correspond to different types of sound. Exemplary categories include human speech, silence, city traffic, emergency vehicle, birds/insects and wild animal. The control signal for the actuator can be adapted to the attributed category. Thereby, the noise pollution resulting from the operation of the thermal management system is further decreased.

In an example, attributing at least one of a plurality of predefined categories may be done in that a probability value is calculated for each category. This means that a probability is assesses by which the detection signal belongs to each of the categories. Thereafter, the category showing the highest probability is attributed to the detection signal. This is a computationally efficient way for attributing at least one of a plurality of predefined categories to a given detection signal.

In an example, the method includes using a trained artificial neural network for attributing the at least one of a plurality of predefined categories to the detection signal. This is computationally efficient and the attribution of the categories is reliable. For example, the trained artificial neural network is used for assigning probabilities to the predefined categories describing the probability that a given detection signal belongs to this category.

The trained artificial neural network may for example be trained in that sounds corresponding to the predefined categories are either detected in reality or detected based on a video recording or a sound recording. Then, the categories are assigned manually. For example, 100 to 1000 different sounds of each category are used for such a training. Of course, also more sounds per category can be used.

In an example, the method includes assessing a degree of loudness of the detection signal and providing the control signal based on the assessed loudness. In simplified words, the method includes evaluating how loud the sound from the environment is. The degree of loudness may for example be measured in decibel. The actuator can thus be operated such that it is less loud, produces a noise of the same loudness or be louder by a predefined maximum delta. This is done by providing an appropriate control signal. Thus, the actuator can be operated such that it is acoustically not noticeable when considering the environmental sound or only noticeable to a predefined degree.

According to an example, the method includes comparing the detection signal to at least one known signal and deriving a diagnosis concerning the traction battery and/or the thermal management system based on the comparison. The method thus is able to detect acoustic abnormalities which may be an indication of wear or failure. For example, a defective control of the actuator can be determined if a noise resulting from the actuator is detected in a situation in which an operation of the actuator is actually not desired. If an abnormality is discovered, it can be logged and/or sent to a diagnosis center via a wireless data connection.

According to an example, providing the control signal includes providing a reference operational parameter to the actuator. The reference operational parameter is for example a duty cycle or a rotational speed. Using such reference operational parameters, the actuator may be efficiently and reliably controlled.

In an example, the method includes providing a charging performance limit signal based on the reference operational parameter of the actuator. The charging performance limit signal for example refers to a charging current or a charging power. Based on the reference operational parameter of the actuator, a cooling power is known or can at least be estimated. From this knowledge or estimation the charging performance limit signal can be derived. In simplified words, when the applicable cooling power is known, the maximum charging power is known which can be provided under the condition that the cooling power cannot be increased.

The method may be at least partly computer-implemented, and may be implemented in software or in hardware, or in software and hardware. Further, the method may be carried out by computer program instructions running on means that provide data processing functions. The data processing means may be a suitable computing means, such as an electronic control module etc., which may also be a distributed computer system. The data processing means or the computer, respectively, may include one or more of a processor, a memory, a data interface, or the like.

According to an example, there is provided a computer program element for operating a thermal management system, which, when being executed by a processing unit, is adapted to perform the method steps of the third aspect.

According to a further example, there is provided a computer readable medium having stored the computer program element of the above-mentioned example.

It should be noted that the above examples may be combined with each other irrespective of the aspect involved. Accordingly, the method may be combined with structural features and, likewise, the apparatus and the system may be combined with features described above with regard to the method.

These and other aspects of the present disclosure will become apparent from and elucidated with reference to the examples described hereinafter.

BRIEF DESCRIPTION OF THE DRAWINGS

Examples of the disclosure will be described in the following with reference to the following drawings.

The figures are merely schematic representations and serve only to illustrate examples of the disclosure. Identical or equivalent elements are in principle provided with the same reference signs.

DETAILED DESCRIPTION

Figure 1:
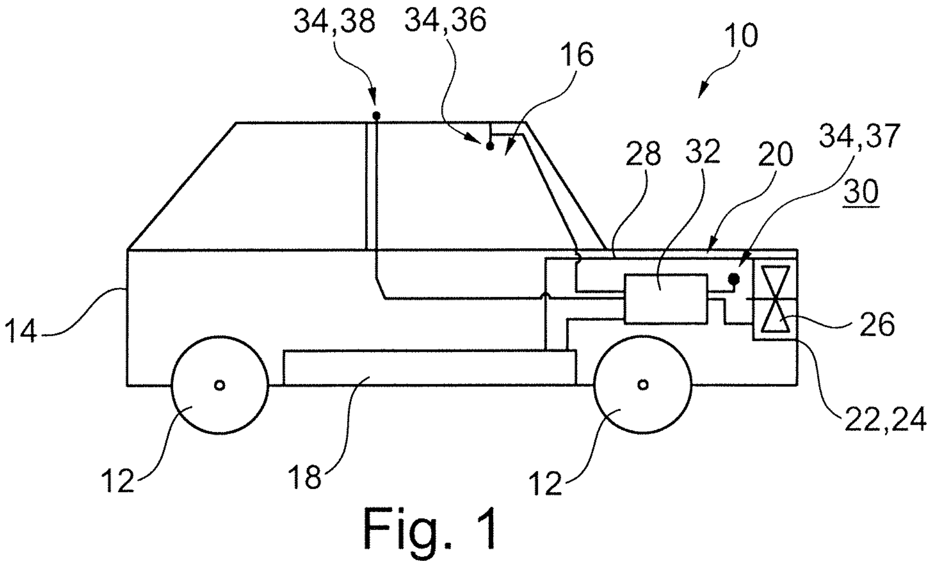
FIG. 1 shows an electric vehicle according to the present disclosure having a thermal management system according to the present disclosure which can be operated by a method for operating a thermal management system according to the present disclosure.

FIG. 1 shows an electric vehicle 10 having wheels 12 and an exterior body shell 14. Inside the body shell 14 a driver/passenger cabin 16 is provided. In a space below the driver/passenger cabin 16 a traction battery 18 is located. The traction battery 18 is equipped with a thermal management system 20.

The thermal management system 20 includes an actuator 22 for influencing a temperature of the traction battery 18. In the present example, the actuator 22 includes a ventilation unit 24 with a ventilator 26. The ventilation unit 24 is connected to the traction battery 18 via a coolant line 28 such that heat originating from the traction battery 18 can be transferred to an environment 30 via the coolant line 28 and the ventilation unit 24.

Moreover, the thermal management system 20 includes a control unit 32. The actuator 22 is communicatively connected to the control unit 32 such that it can be controlled by the control unit 32. In other words, the control unit 32 is configured for providing a control signal to the actuator 22.

The thermal management system 20 additionally includes a microphone 34 being a first internal microphone 36. The first internal microphone 36 is located in an interior of the electric vehicle 10, more precisely in the driver/passenger cabin 16. The thermal management system 20 also includes a further microphone 34 being a second internal microphone 37. The second internal microphone 37 is located in an interior of the electric vehicle 10, more precisely in a motor compartment thereof. The thermal management system 20 includes a further microphone 34 which is an external microphone 38. The external microphone 38 is located at an exterior of the body shell 14 of the electric vehicle 10. All microphones 36, 37, 38 are configured for detecting a sound in the environment 30 of the thermal management system 20 and the vehicle 10. Also, the microphones 36, 37, 38 are communicatively connected to the control unit 32. Thus, detection signals D of the microphones 36, 37, 38 are available in the control unit 32 and the actuator 22 can be controlled by the control unit 32 based on the detection signals.

Figure 2:
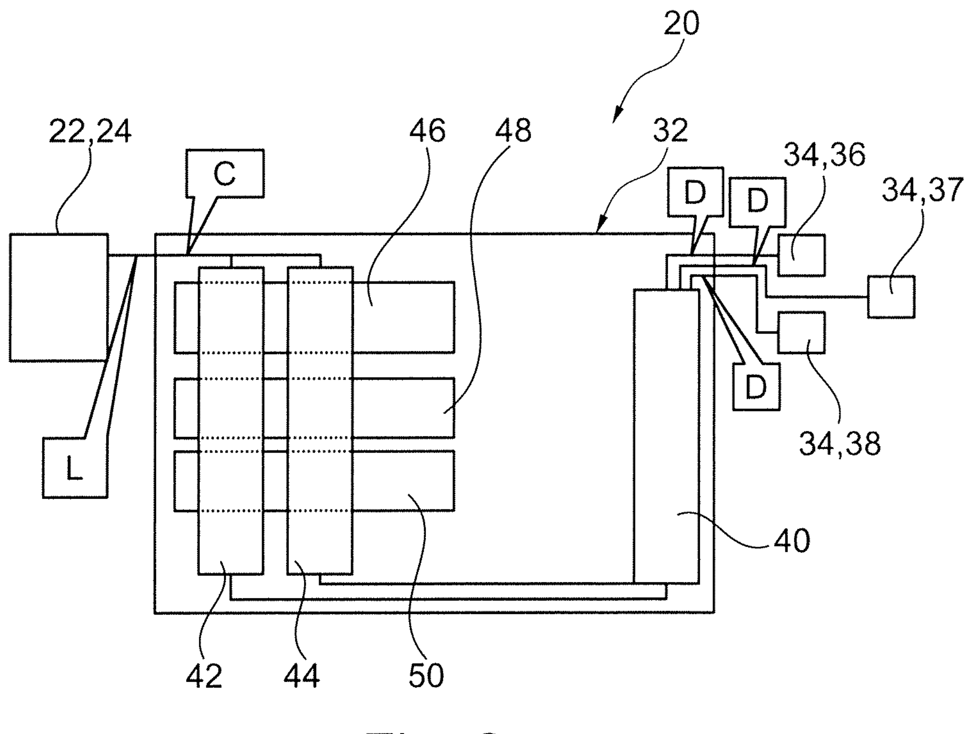
FIG. 2 shows the thermal management system of FIG. 1 in a partially more detailed view.

To this end, the control unit 32 includes an analogue digital converter 40 which may also be canned an audio interface (cf. FIG. 2). The analogue digital converter 40 may transform an analogue detection signal D of the microphones 36, 37, 38 into a corresponding digital detection signal D. The analogue digital converter 40 is connected to a storage unit 42 of the control unit 32 and to a processing unit 44 of the control unit 32 such that the digital detection signal D can be stored in the storage unit 42 and/or processed in the processing unit 44. The processing unit 44 includes for example a microprocessor.

The control unit 32 also includes a volume unit 46 being configured for receiving the detection signal D, in the present example the digital version of the detection signal D. The volume unit 46 is further configured for assessing a degree of loudness of the detection signal. The volume unit 46 may be formed by the hardware of the storage unit 42 and the processing unit 44 and corresponding software running thereon.

Additionally, the control unit 32 includes a classification unit 48 being configured for receiving the detection signal D. Moreover, the classification unit 48 is configured for attributing at least one of a plurality of predefined categories to the detection signal D. This will be explained in detail further below in connection with the method according to the present disclosure. Also the classification unit 48 may be formed by the hardware of the storage unit 42 and the processing unit 44 and corresponding software running thereon.

Furthermore, the control unit 32 includes a diagnostics unit 50 which is configured for receiving the detection signal D of the at least one microphone 34, 36, 37, 38 and for providing a diagnosis result based on the detection signal. As before, the diagnostics unit 50 may be formed by the hardware of the storage unit 42 and the processing unit 44 and corresponding software running thereon.

Figure 3:
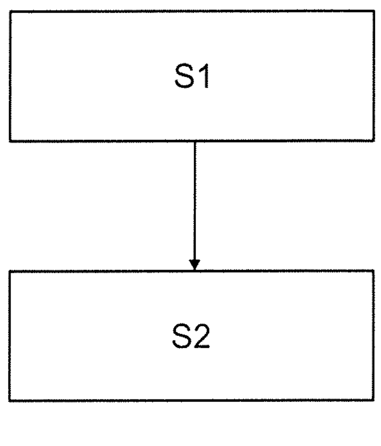
FIG. 3 shows steps of the method according to the present disclosure.
Figure 4:
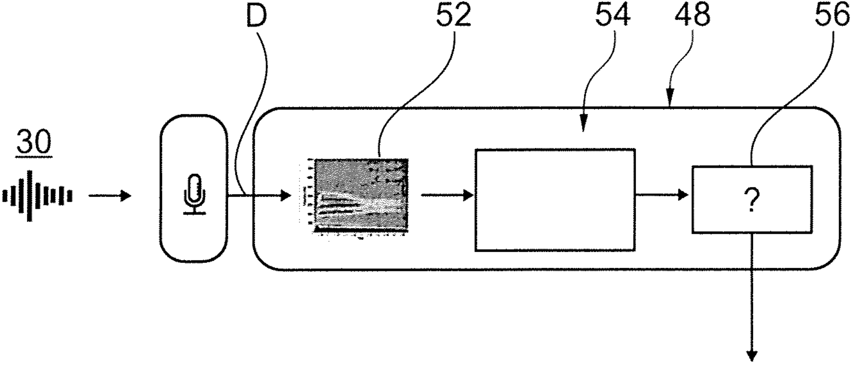
FIG. 4 shows a detail of the thermal management system of FIG. 2 and the method of FIG. 3.

The thermal management system 20 may be operated by a method for operating a thermal management system for a traction battery of an electric vehicle which is illustrated in FIG. 3. This method is performed during charging of the traction battery. In such a situation the vehicle 10 stands still. A first step S1 of the method consists in receiving the detection signal D corresponding to a sound in the environment 30 of the thermal management system 20. Since the present thermal management system 20 uses three microphones 34, in the present case, three detection signals D are received, one from each microphone 34. In a second step S2, a control signal C is provided to the actuator 22 for influencing a temperature of the traction battery 18 based on the detection signal D (see also FIG. 2). For the ease of understanding, the following explanation will use one of the three detection signals D only.

In the present example, the control signal C includes a reference operational parameter in the form of a reference duty cycle being a percentage of a maximum duty cycle. During the performance of the second step S2, the method includes assessing a degree of loudness of the detection signal D and providing the control signal C based on the assessed loudness. In other words, it is assessed how load the sound of the environment 30 is. Furthermore, at least one of a plurality of predefined categories is attributed to the detection signal D. For purely illustrative purposes it will be assumed that the predefined categories are cooling fan noise, human speech and traffic noise. To this end the detection signal D is fed into a spectral analyzer unit 52 forming part of the classification unit 48. In the spectral analyzer unit 52 the detection signal D is decomposed in a finite number of signals each having a single frequency, e.g. by performing a Fourier Analysis. The plurality single frequency signals is then provided to a trained artificial neural network 54. In other words the resulting spectrum is provided to the trained artificial neural network 54.

The trained artificial neural network 54 is configured for determining probabilities by which the received spectrum belongs to any one of the categories fan noise, human speech and traffic noise, e.g. the probability that the spectrum of the present example is fan noise is determined to be 20%, the probability that the spectrum is human speech is 50% and the probability that the spectrum is traffic noise is 40%. It has to be noted that the sum of percentages is not necessarily 100% since the percentages are determined with regard to a single category only.

The categories with the assigned probabilities in form of the percentages are then provided to a comparator unit 56 also forming part of the classification unit 48 and the category with the highest probability, i.e. having the highest percentage, is attributed to the determination signal D. Based on this classification and again assuming that the control signal C is a duty cycle, the control signal C may be provided according to the following rules. If the attributed category is fan noise, the duty cycle is reduced by 5% from a current duty cycle level. If the attributed category is human speech, as in the present example, the duty cycle is reduced to the value of 20% in order not to disturb the persons in the surroundings. If the attributed category is traffic noise, the duty cycle is increased by 5%.

As has already been explained before, the method can be performed periodically such that the thermal management system 20 is operated in a closed loop control. In addition, the method may provide a charging performance limit signal L based on the reference operational parameter of the actuator 22. It is obvious that if in the current example the duty cycle is reduced to e.g. 20%, also a corresponding cooling power is reduced. This provides limitations to the charging performance.

In the present example, the method can also compare the detection signal D provided by the microphones 34 to at least one known signal. From this comparison, a diagnosis concerning the traction battery 18 and/or the thermal management system 20 may be derived. Thus, an acoustic diagnosis can be provided detecting abnormalities in the operation of the traction battery 18 and/or the thermal management system 20.

It is noted that in the present context, the storage unit 42 also constitutes a computer readable medium. On this storage unit 42 there may be stored a computer program element for operating the thermal management system 20, which, when being executed by the processing 44 unit, is adapted to perform the method steps as explained above. It is further noted that the three microphones 34, 36, 37, 38 are shown for illustrative purposes only. Of course it is also possible to have just one of the microphones 34, 36, 37, 38 or a selection of two out of the microphones 34, 36, 37, 38.

Other variations to the disclosed examples can be understood and effected by those skilled in the art in practicing the claimed invention, from the study of the drawings, the disclosure, and the appended claims. In the claims the word "comprising" does not exclude other elements or steps and the indefinite article "a" or "an" does not exclude a plurality. A single processor or other unit may fulfill the functions of several items or steps recited in the claims. The mere fact that certain measures are recited in mutually different dependent claims does not indicate that a combination of these measures cannot be used to advantage. A computer program may be stored/distributed on a suitable medium such as an optical storage medium or a solid-state medium supplied together with or as part of other hardware, but may also be distributed in other forms, such as via the Internet or other wired or wireless telecommunication systems. Any reference signs in the claims should not be construed as limiting the scope of the claims.

The invention claimed is:

1. A thermal management system for a traction battery of an electric vehicle, comprising:

an actuator for influencing a temperature of the traction battery;

at least one microphone for detecting a sound in an environment of the thermal management system; and a control unit, wherein the control unit comprises a classification unit being configured for receiving a detection signal (D) of the at least one microphone and being configured for attributing at least one of a plurality of predefined sound source categories to the detection signal (D);

the actuator and the at least one microphone being communicatively connected to the control unit such that the actuator is controllable, by the control unit, based on the detection signal (D) and the at least one of the plurality of predefined sound source categories attributed to the detection signal (D).

2. The thermal management system according to claim 1, wherein the actuator comprises a ventilator.

3. The thermal management system according to claim 1, wherein the at least one microphone is an internal microphone being configured for being located in an interior of the electric vehicle.

4. The thermal management system according to claim 1, wherein the at least one microphone is an external microphone being configured for being located at an exterior of the electric vehicle.

5. The thermal management system according to claim 1, wherein the control unit comprises a volume unit being configured for receiving the detection signal (D) of the at least one microphone and being configured for assessing a degree of loudness of the detection signal (D).

6. The thermal management system according to claim 1, wherein the control unit comprises a diagnostics unit being configured for receiving the detection signal (D) of the at least one microphone and being configured for providing a diagnosis result based on the detection signal (D).

7. An electric vehicle, comprising:

a traction battery; and a thermal management system, comprising:

an actuator for influencing a temperature of the traction battery;

at least one microphone for detecting a sound in an environment of the thermal management system; and a control unit, wherein the control unit comprises a classification unit being configured for receiving a detection signal (D) of the at least one microphone and being configured for attributing at least one of a plurality of predefined sound source categories to the detection signal (D);

the actuator and the at least one microphone being communicatively connected to the control unit such that the actuator is controllable, by the control unit, based on the detection signal (D) and the at least one of the plurality of predefined sound source categories attributed to the detection signal (D);

wherein the at least one microphone is mounted in an interior of the electric vehicle or at an exterior body shell of the electric vehicle.

8. A method for operating a thermal management system for a traction battery of an electric vehicle during charging of the traction battery (18), comprising:

receiving a detection signal (D) corresponding to a sound in an environment of the thermal management system;

attributing at least one of a plurality of predefined sound source categories to the detection signal (D) and providing the control signal (C) based on the attributed sound source category; and providing a control signal (C) to an actuator for influencing a temperature of the traction battery based on the detection signal (D).

9. The method according to claim 8, comprising:

using a trained artificial neural network for attributing the at least one of a plurality of predefined categories to the detection signal (D).

10. The method according to claim 8, comprising:

assessing a degree of loudness of the detection signal (D) and providing the control signal (C) based on the assessed loudness.

11. The method according to claim 8, comprising:

comparing the detection signal (D) to at least one known signal and deriving a diagnosis concerning the traction battery and/or the thermal management system based on the comparison.

12. The method according to claim 8, wherein providing the control signal (C) comprises providing a reference operational parameter to the actuator.

13. The method according to claim 12, comprising:

providing a charging performance limit signal (L) based on the reference operational parameter of the actuator.

* * * * *